(12) United States Patent
Chen (10) Patent No.: US 9,823,429 B1
(45) Date of Patent: Nov. 21, 2017

(54) PLUGGABLE CONNECTOR WITH ANTI-ELECTROMAGNETIC INTERFERENCE CAPABILITY

(71) Applicant: Oupiin Electronic (Kunshan) Co., Ltd., Kunshan (CN)

(72) Inventor: Hsin chih Chen, Kunshan (CN)

(73) Assignee: Oupiin Electronic (Kunshan) Co., Ltd. (CN)

( * ) Notice: Subject to any disclaimer, the term of this patent is extended or adjusted under 35 U.S.C. 154(b) by 0 days.

(21) Appl. No.: 15/497,154

(22) Filed: Apr. 25, 2017

(30) Foreign Application Priority Data

Mar. 22, 2017 (CN) .......................... 2017 1 0172079

(51) Int. Cl.
   *G02B 6/38* (2006.01)
   *H01R 13/6583* (2011.01)
   *H01R 13/658* (2011.01)

(52) U.S. Cl.
   CPC ....... *G02B 6/3895* (2013.01); *H01R 13/6583* (2013.01); *H01R 13/65802* (2013.01)

(58) Field of Classification Search
   None
   See application file for complete search history.

(56) References Cited

U.S. PATENT DOCUMENTS 9,312,618 B2 * 4/2016 Regnier ............... H01R 9/2408

* cited by examiner

*Primary Examiner* — Uyen Chau N Le
*Assistant Examiner* — Chad Smith
(74) *Attorney, Agent, or Firm* — Roger D. Emerson; Emerson, Thomson & Bennett, LLC (57) ABSTRACT

A pluggable connector with anti-electromagnetic interference capability is disclosed in this invention, which includes a socket housing, multiple terminal assemblies and a shielding case. The socket housing includes an insulating base, a first anti-EMI block independently mounted on the insulating base and a second anti-EMI block independently mounted on the insulating base. The first anti-EMI block and an upper bracket can be combined together to form an upper circuit board slot, and the second anti-EMI block and a lower bracket can be combined together to form a lower circuit board slot. The pluggable connector of the present invention has a good anti-electromagnetic interference capability by the first and second anti-EMI blocks.

10 Claims, 13 Drawing Sheets

PLUGGABLE CONNECTOR WITH ANTI-ELECTROMAGNETIC INTERFERENCE CAPABILITY

BACKGROUND OF THE INVENTION

1. Field of the Invention

The present invention relates to a connector technology, and more particularly to a pluggable connector with anti-electromagnetic interference capability.

2. Description of the Prior Art

A connector generally includes a metal shell, an insulating body and a conductive terminal. The insulating body is usually made of insulating material, and the metal shell is used for shielding electromagnetic interference.

Currently, the market requires a high speed, high density connector, such as a zQSFP (z-Quad Small Form-factor Pluggable Plus) connector, the data transfer rate of which can be as high as 28 Gbps. For this high speed, high density connector, it is very difficult to achieve a breakthrough in the ability to resist electromagnetic interference by simply relying on the existing metal shell.

Hence, it is necessary to further develop a pluggable connector with more strong anti-electromagnetic interference capability.

BRIEF SUMMARY OF THE INVENTION

A primary object of the present invention is to provide a pluggable connector with anti-electromagnetic interference capability, which disposes two separate anti-EMI blocks to improve the anti-electromagnetic interference capability of the pluggable connector.

Other objects and advantages of the present invention may be further understood from the technical features disclosed by the present invention.

To achieve the aforementioned object or other objects of the present invention, the present invention adopts the following technical solution.

The present invention provides a pluggable connector with anti-electromagnetic interference capability, which comprises a socket housing, multiple terminal assemblies and a shielding case. The socket housing includes an insulating base, a first anti-EMI block independently mounted on the insulating base and a second anti-EMI block independently mounted on the insulating base. The insulating base has an upper bracket extending horizontally and a lower bracket being extending horizontally and being located under the upper bracket. The first anti-EMI block is combined with the upper bracket to form an upper circuit board slot. The second anti-EMI block is combined with the lower bracket to form a lower circuit board slot. The insulating base further has a mounting frame extending rearward from the top of the insulating base and a mounting space formed below the mounting frame. These terminal assemblies are mounted in the mounting space and include multiple signal terminal assemblies and multiple ground terminal assemblies. These terminal assemblies are arranged side by side in the order of ground-signal-signal. The shielding case has an upper port and a lower port. The upper port is aligned with the upper circuit board slot, and the lower port is aligned with the lower circuit board slot.

In one embodiment, the upper bracket is inverted U type, and the lower bracket is U type; the upper bracket and the lower bracket are symmetrical to each other and separated from each other. The first anti-EMI block has an upper horizontal insulation board and an upper metal member fixed in the upper horizontal insulation board; the upper metal member has an upper horizontal grounding sheet embedded in the upper horizontal insulation board, and a vertical grounding arm being perpendicularly connected to the upper horizontal grounding sheet and extending toward left and right sides; the upper horizontal insulation board is combined with the upper bracket to close the bottom of the upper bracket and form an upper circuit board slot. The second anti-EMI block has a lower horizontal insulation board and a lower metal member fixed in the lower horizontal insulation board; the lower horizontal insulation board is combined with the lower bracket to close the top of the lower bracket and form a lower circuit board slot. The insulating base further includes two rows of upper terminal-receiving grooves formed respectively on the upper bracket and on upper horizontal insulation board and located in the upper circuit board slot, and two rows of lower terminal-receiving grooves formed respectively on the lower bracket and on the lower horizontal insulation board and located in the lower circuit board slot.

In one embodiment, each terminal assembly includes a support frame, a pair of upper conductive contact parts extending forward from the front of the support frame, a pair of lower conductive contact parts extending forward from the front of the support frame and being located under the pair of upper conductive contact parts, and multiple conductive tails extending downward from the bottom of the support frame; the pair of upper conductive contact parts are inserted into the corresponding upper terminal-receiving grooves and are exposed in the upper circuit board slot; and the pair of lower conductive contact parts are inserted into the corresponding lower terminal-receiving grooves and are exposed in the lower circuit board slot.

In one embodiment, the upper bracket is provided with a pair of upper guiding grooves; the lower bracket is provided with a pair of lower guiding grooves; the upper horizontal insulation board has two first flanges formed on two sides thereof respectively; and the lower horizontal insulation board has two second flanges formed on two sides thereof respectively. When the first and second anti-EMI blocks are combined with the insulating base, the two first flanges are inserted into the corresponding upper guiding grooves to close the upper bracket, and the two second flanges are inserted into the corresponding lower guiding grooves to close the lower bracket.

In one embodiment, the vertical grounding arm has two end portions, which are respectively located on two sides of the vertical grounding arm and are perpendicularly bent toward the insulating base; each end portion forms a protrusion thereon.

In one embodiment, the vertical grounding arm further has a holding piece, which is located on the bottom of the vertical grounding arm and bent toward the insulating base; the holding piece can be engaged with a holding hole formed on the insulating base.

In one embodiment, the pluggable connector further comprises a light guide member, which includes two symmetrical light guide tubes being connected together and being made of materials suitable for propagating light, wherein the rear of the two light guide tubes are mounted on two sides of the socket housing, and the front of the two light guide tubes are located in front of the socket housing.

In one embodiment, the pluggable connector further comprises a retainer for fixing these terminal assemblies, wherein the retainer is U-shaped and has a first holding arm and two parallel second holding arms being perpendicular to the first holding arm. The insulating base disposes two holding slots located respectively on two sides thereof. When these terminal assemblies are mounted on the socket housing, the retainer holds the terminal assemblies from the rear of the terminal assemblies, and the fronts of the two second holding arms are engaged with the corresponding holding slots to fix these terminal assemblies.

In one embodiment, there form multiple long grooves on the top of the mounting space to fix the corresponding terminal assemblies.

In one embodiment, the shielding case includes a shielding frame, a bottom plate mounted on the bottom of the shielding frame, a rear plate mounted on the rear of the shielding frame, a cover around the front of the shielding frame, and a spacer located in the middle of the shielding frame for separating the upper port and the lower port.

In comparison with the prior art, the pluggable connector of the present invention employs the two separate anti-EMI blocks to improve the anti-electromagnetic interference capability of the pluggable connector.

DETAILED DESCRIPTION OF THE PREFERRED EMBODIMENTS

The following description of every embodiment with reference to the accompanying drawings is used to exemplify a specific embodiment, which may be carried out in the present invention. Directional terms mentioned in the present invention, such as "up", "down", "front", "back", "left", "right", "top", "bottom" etc., are only used with reference to the orientation of the accompanying drawings. Therefore, the used directional terms are intended to illustrate, but not to limit, the present invention.

Please refer to FIGS. 1 to 4, a pluggable connector 1 of the present invention includes a shielding case 10, a light guide member 20, a socket housing 30 and multiple terminal assemblies 40.

Figure 1:
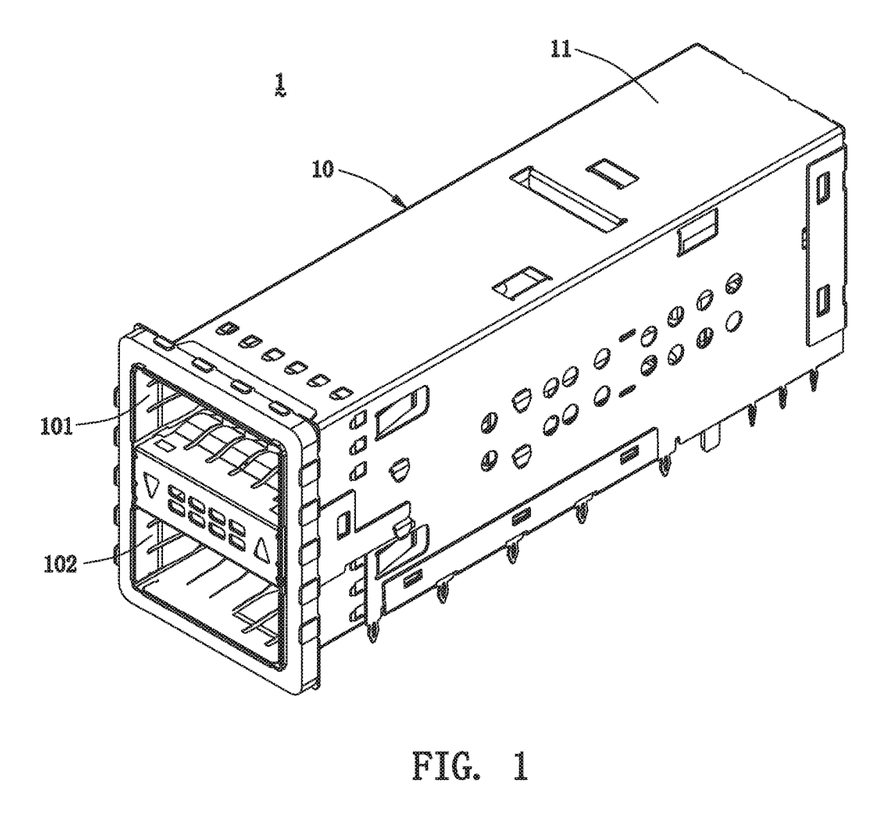
FIG. 1 is a perspective schematic view of a pluggable connector of the present invention.

Referring to FIG. 1, the shielding case 10 forms an upper port 101 and a lower port 102, which are located in the front of the shielding case 10 and are vertically spaced apart, to be used for receiving an outer plug module (not shown).

Figure 2:
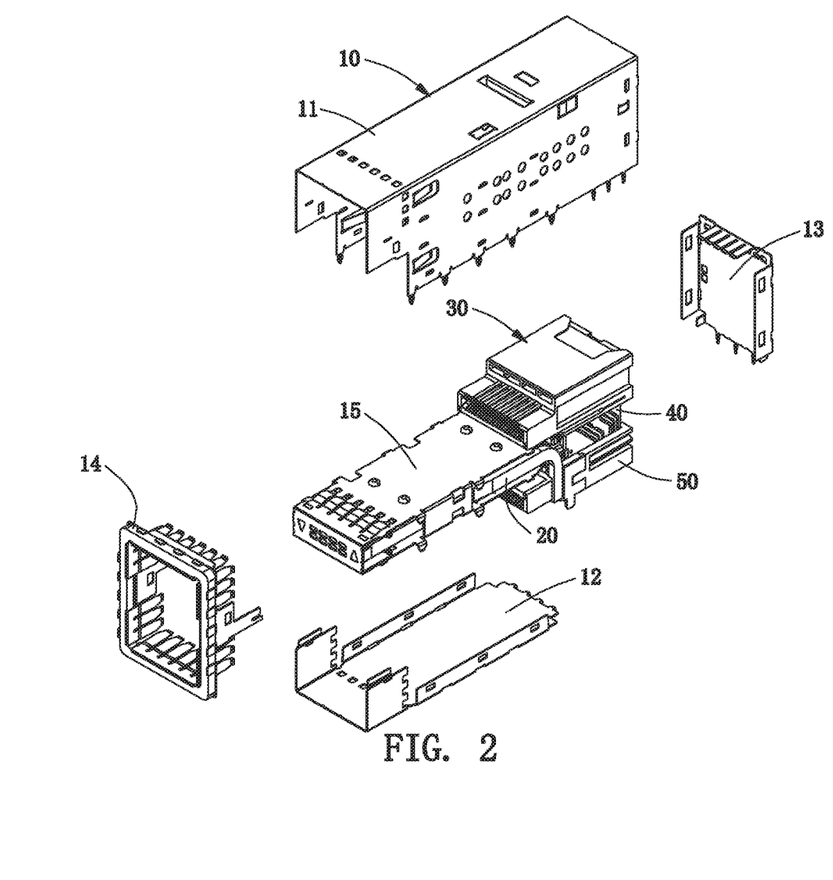
FIG. 2 is a perspective schematic view showing that a shielding case of FIG. 1 is disassembled.

Referring to FIG. 2, the shielding case 10 includes a shielding frame 11, a bottom plate 12 mounted on the bottom of the shielding frame 11, a rear plate 13 mounted on the rear of the shielding frame 11, a cover 14 around the front of the shielding frame 11, and a spacer 15 located in the middle of the shielding frame 11 for separating the upper port 101 and the lower port 102.

Figure 3:
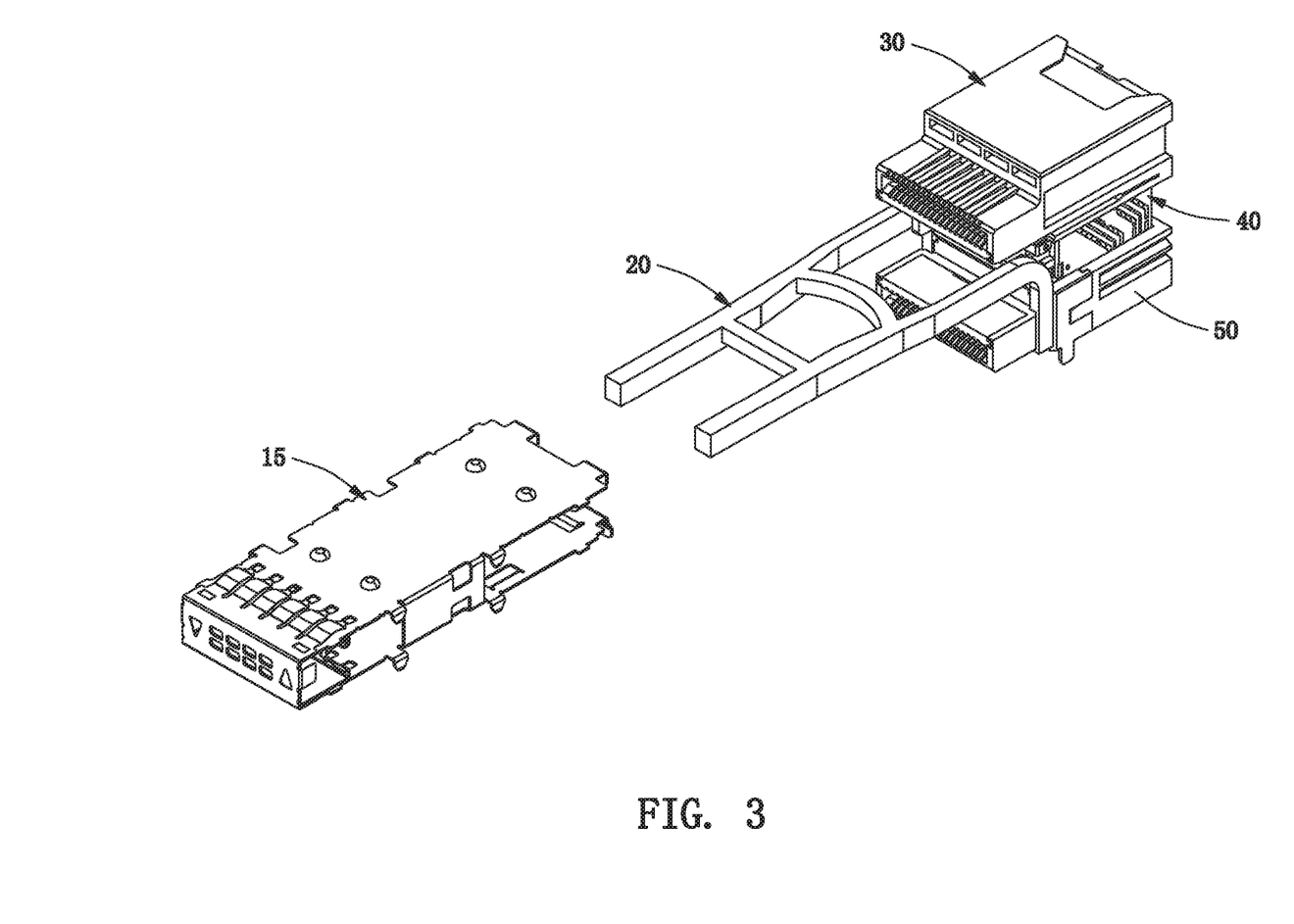
FIG. 3 is a perspective schematic view showing that a spacer of FIG. 2 is further disassembled.

Referring to FIG. 3, the spacer 15 is U-shaped. The spacer 15 can substantially cover the light guide member 20.

Figure 4:
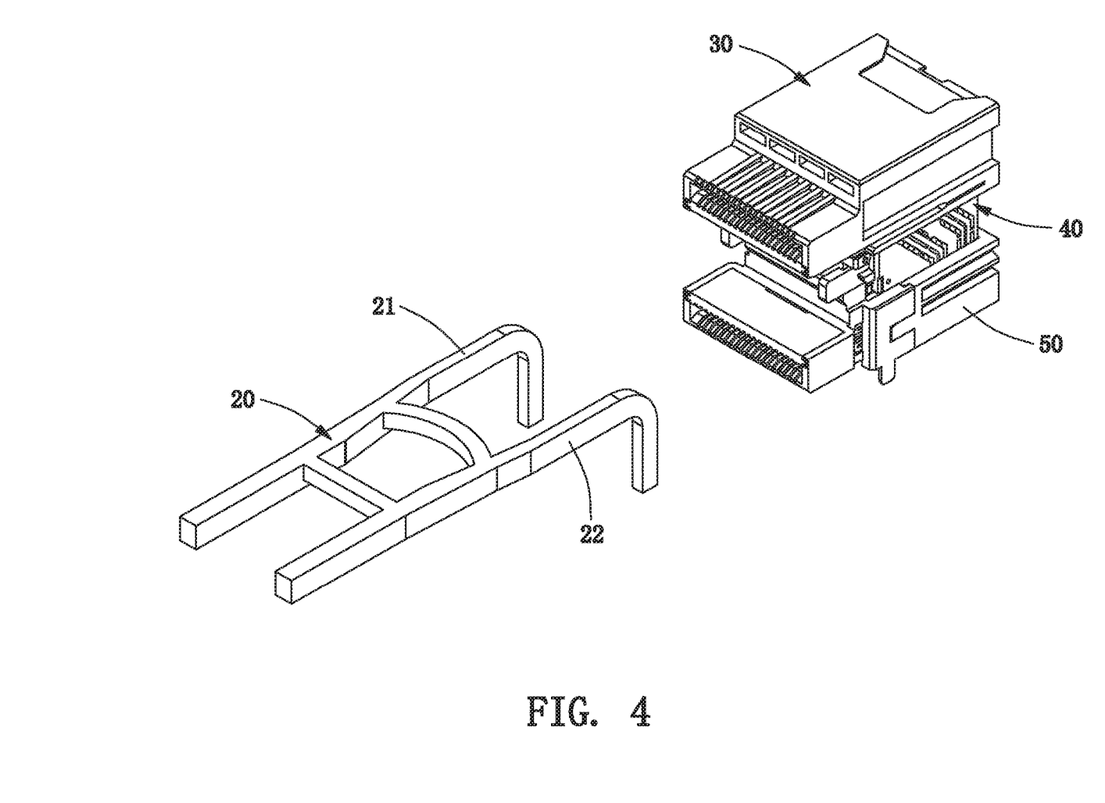
FIG. 4 is a perspective schematic view showing that a light guide member of FIG. 3 is disassembled.

Referring to FIG. 4, the light guide member 20 includes two symmetrical light guide tubes 21, 22, which are connected together and are made of materials suitable for propagating light. The rear of the two light guide tubes 21, 22 are mounted on two sides of the socket housing 30, and the front of the two light guide tubes 21, 22 are located in front of the socket housing 30.

Figure 5:
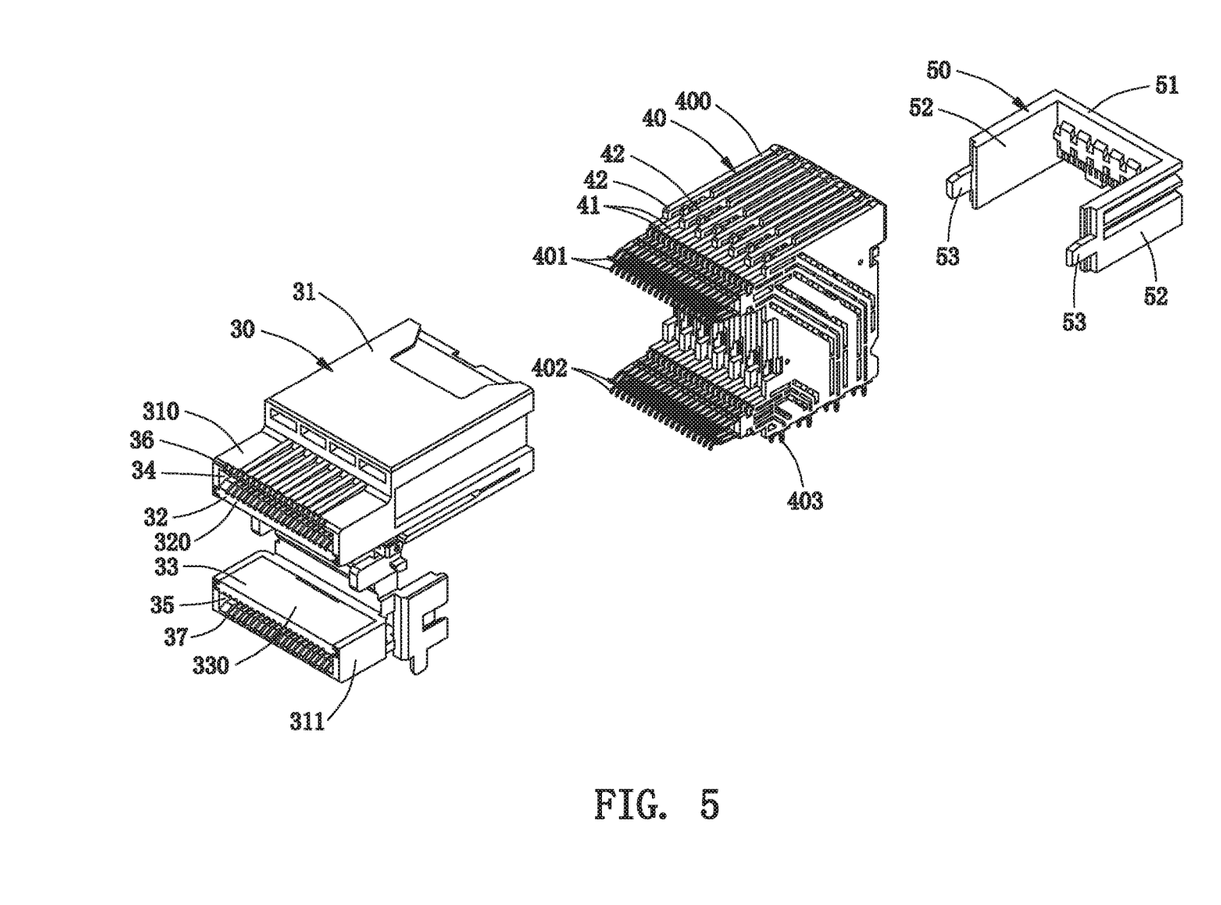
FIG. 5 is a perspective schematic view of a socket housing, multiple terminal assemblies and a retainer, which are disassembled.
Figure 8:
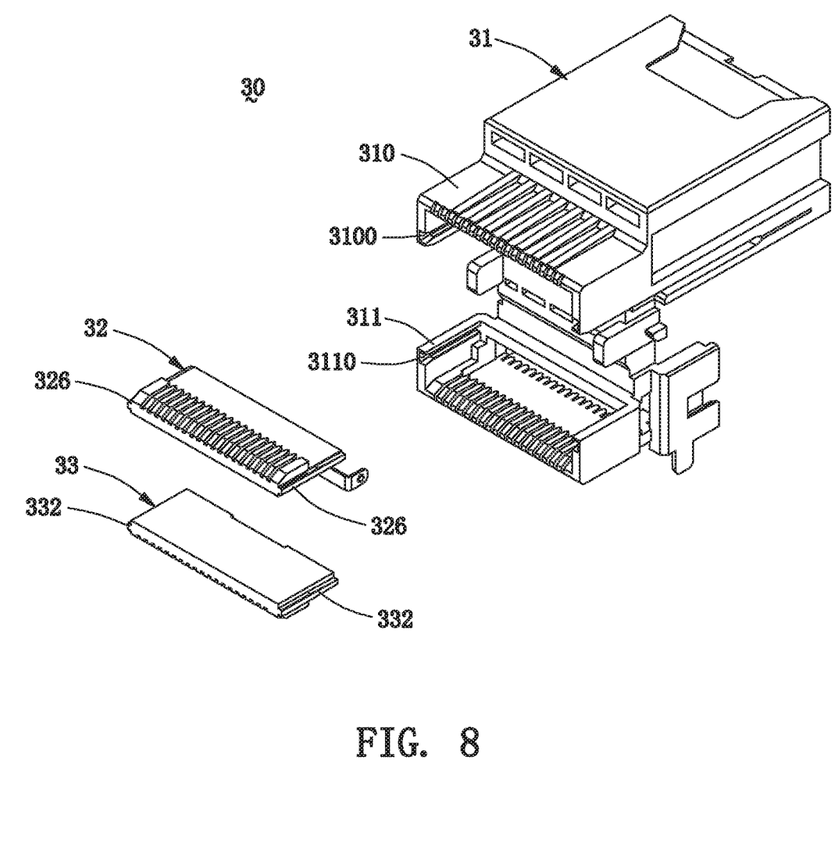
FIG. 8 is an exploded view of the socket housing of FIG. 5.
Figure 9:
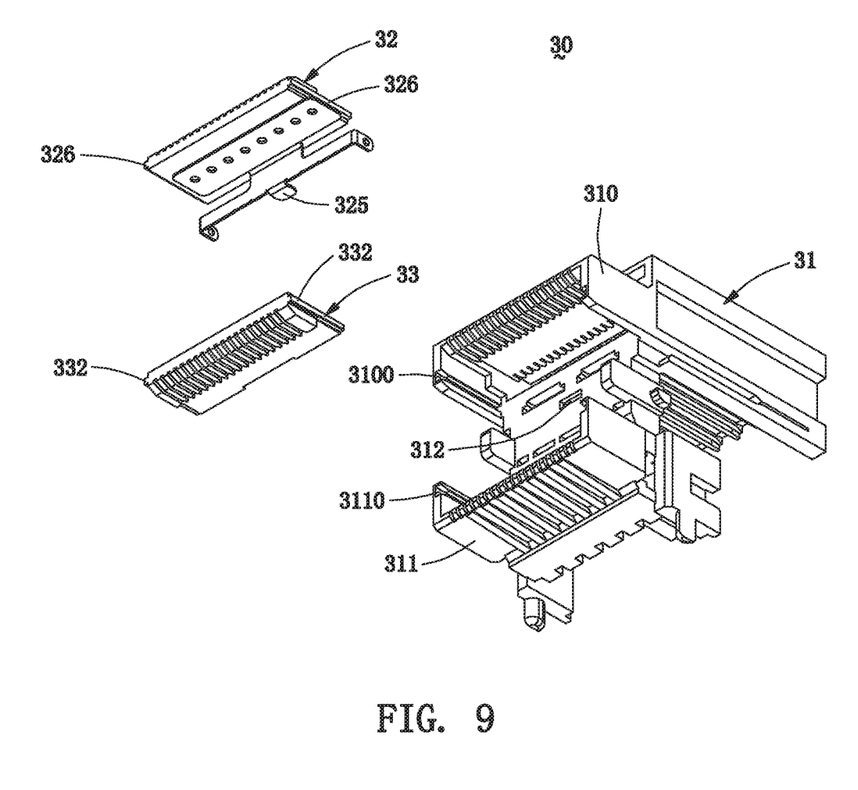
FIG. 9 is an exploded view of the socket housing disassembled along another direction.

Please refer to FIGS. 5, 8 and 9, the socket housing 30 includes an insulating base 31, a first anti-EMI block 32 independently mounted on the insulating base 31, and a second anti-EMI block 33 independently mounted on the insulating base 31. The first and second anti-EMI blocks 32 are independent of each other. Namely, the first and second anti-EMI blocks 32 are separated from each other.

Referring to FIGS. 8 and 9, the insulating base 31 has an upper bracket 310 extending horizontally and a lower bracket 311 extending horizontally. The lower bracket 311 is located under the upper bracket 310, is symmetrical to the upper bracket 310 and is separated from the upper bracket 310. In the embodiment, the upper bracket 310 is inverted U type, and the lower bracket 311 is U type. The upper bracket 310 is provided with a pair of upper guiding grooves 3100 formed on two opposite inner walls of the upper bracket 310. The lower bracket 311 is provided with a pair of lower guiding grooves 3110 formed on two opposite inner walls of the lower bracket 311.

Figure 10:
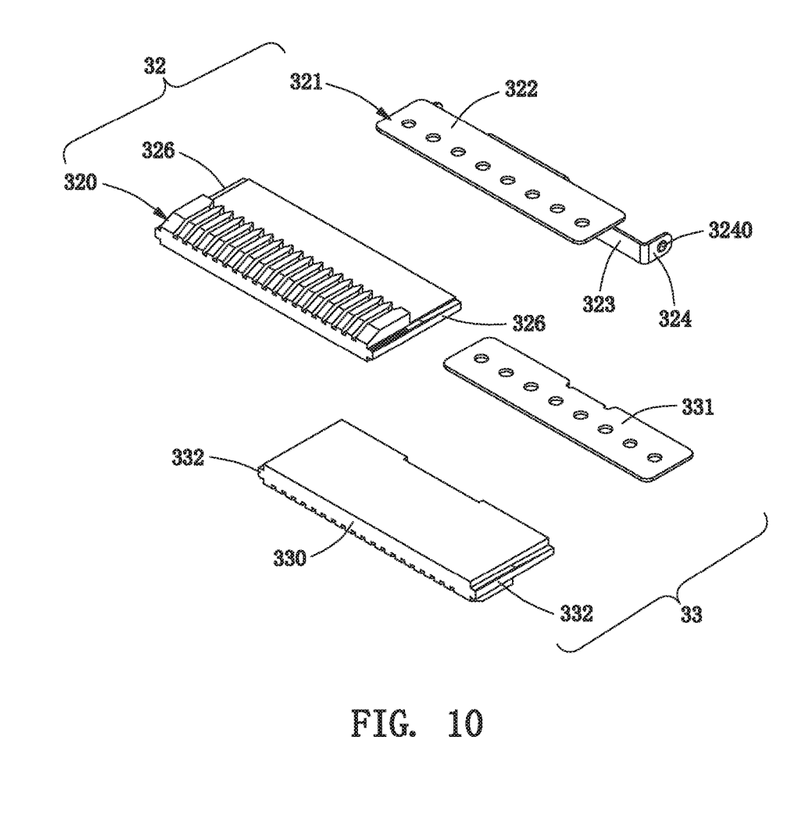
FIG. 10 is an exploded view of two anti-EMI blocks of FIG. 8.
Figure 11:
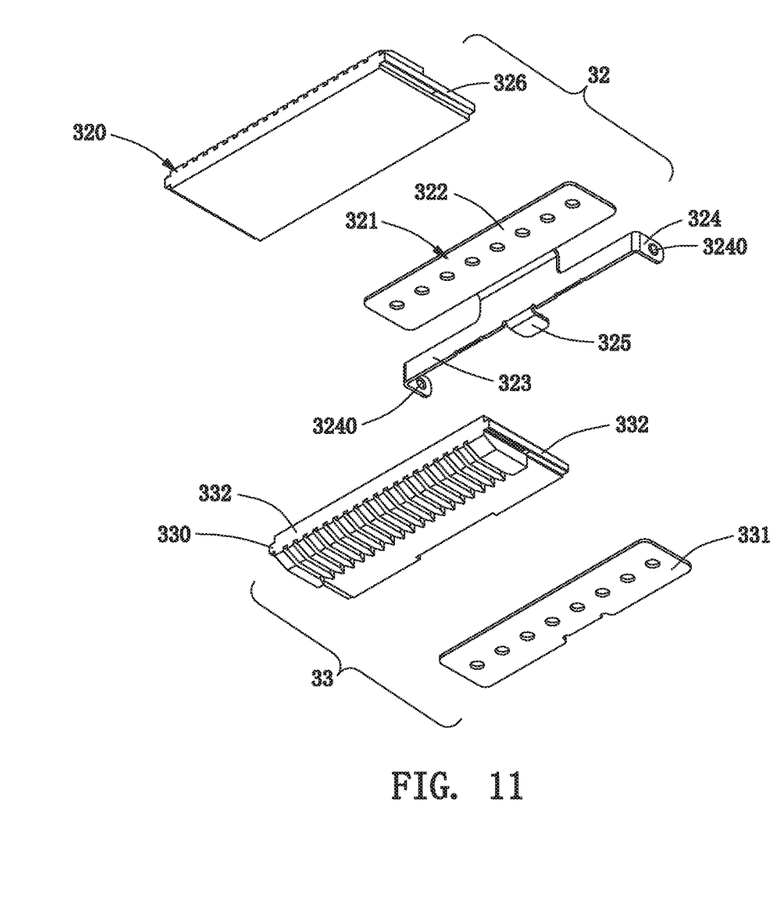
FIG. 11 is an exploded view of the two anti-EMI blocks disassembled along another direction.

Please refer to FIGS. 10 and 11, the first anti-EMI block 32 has an upper horizontal insulation board 320 and an upper metal member 321 fixed in the upper horizontal insulation board 320. In the embodiment, the upper metal member 321 has an upper horizontal grounding sheet 322 embedded in the upper horizontal insulation board 320, and a vertical grounding arm 323 being perpendicularly connected to the upper horizontal grounding sheet 322 and extending toward left and right sides. The vertical grounding arm 323 has two end portions 324, which are respectively located on two sides of the vertical grounding arm 323 and are perpendicularly bent toward the insulating base 31. The vertical grounding arm 323 further has a holding piece 325 located on the bottom of the vertical grounding arm 323 and bent toward the insulating base 31. Each end portion 324 forms a protrusion 3240 thereon. After assembled, the protrusions 3240 can contact with the shielding frame 11 shown in FIG. 2 thereby forming a grounding path and achieving the purpose of anti-electromagnetic interference. The upper horizontal insulation board 320 has two first flanges 326 formed on two sides thereof respectively. In the embodiment, the upper horizontal grounding sheet 322 is embedded into the upper horizontal insulation board 320 by injection molding process.

Referring to FIGS. 10 and 11, the second anti-EMI block 33 has a lower horizontal insulation board 330 and a lower metal member 331 fixed in the lower horizontal insulation board 330. In the embodiment, the lower horizontal insulation board 330 has two second flanges 332 formed on two sides thereof respectively. The lower metal member 331 is a rectangular piece. In the embodiment, the lower metal member 331 is embedded in the lower horizontal insulation board 330 by injection molding process.

Referring to FIG. 5, the first and second anti-EMI blocks 32, 33 are mounted between the upper bracket 310 and the lower bracket 311. The upper horizontal insulation board 320 is combined with the upper bracket 310 and can close the bottom of the upper bracket 310 to form an upper circuit board slot 34 for receiving an upper circuit board of the outer plug module. The lower horizontal insulation board 330 is combined with the lower bracket 311 and can close the top of the lower bracket 311 to form a lower circuit board slot 35 for receiving a lower circuit board of the outer plug module.

More specifically, please refer to FIGS. 8 and 9, the two first flanges 326 are inserted into the corresponding upper guiding grooves 3100, and the two second flanges 332 are inserted into the corresponding lower guiding grooves 3110, whereby the first and second anti-EMI blocks 32, 33 are smoothly mounted in the insulating base 31. Moreover, as shown in FIG. 9, the holding piece 325 of the first anti-EMI block 32 is inserted into a holding hole 312 formed on the insulating base 31 for further fixing the first anti-EMI block 32 onto the insulating base 31.

Referring to FIG. 5, the insulating base 31 further includes two rows of upper terminal-receiving grooves 36 formed respectively on the upper bracket 310 and on upper horizontal insulation board 320 and located in the upper circuit board slot 34, and two rows of lower terminal-receiving grooves 37 formed respectively on the lower bracket 311 and on the lower horizontal insulation board 330 and located in the lower circuit board slot 34.

Figure 6:
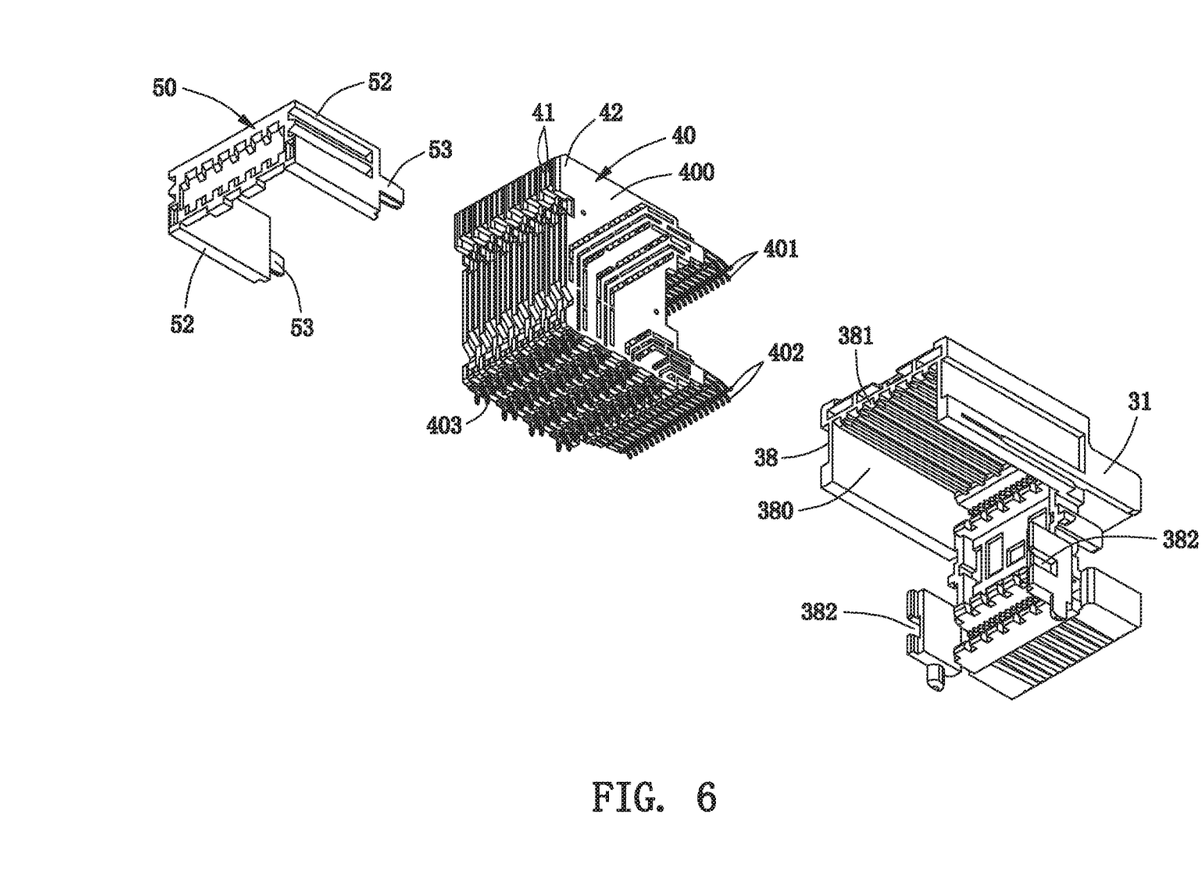
FIG. 6 is a perspective schematic view of the socket housing, the terminal assemblies and the retainer, which are disassembled along another direction.

Referring to FIG. 6, the insulating base 31 further has a mounting frame 38 extending rearward from the top of the insulating base 31, and a mounting space 380 formed below the mounting frame 38 to receive the terminal assemblies 40. There form multiple swallow-tailed long grooves 381 on the top of the mounting space 380 to be used to fix the corresponding terminal assemblies 40. Further, the insulating base 31 disposes two holding slots 382 located respectively on two sides of the insulating base 31.

As shown in FIG. 5, these terminal assemblies 40 include multiple signal terminal assemblies 41 and multiple ground terminal assemblies 42. These terminal assemblies 40 are arranged side by side in the order of ground-signal-signal.

Referring to FIGS. 5 and 6, each terminal assembly 40 includes a support frame 400, a pair of upper conductive contact parts 401 extending forward from the front of the support frame 400, a pair of lower conductive contact parts 402 extending forward from the front of the support frame 400, and multiple conductive tails 403 extending downward from the bottom of the support frame 400.

Referring to FIGS. 5 and 6, these terminal assemblies 40 are inserted into the mounting space 380 from the rear of the mounting frame 38 along the corresponding long grooves 381. For a single terminal assembly 40, the pair of upper conductive contact parts 401 thereof are inserted into the corresponding upper terminal-receiving grooves 36 and are exposed in the upper circuit board slot 34 to be ready to be electrically connected with the upper plug circuit boards of the outer plug module; the pair of lower conductive contact parts 402 thereof are inserted into the corresponding lower terminal-receiving grooves 37 and are exposed in the lower circuit board slot 35 to be ready to be electrically connected with the lower plug circuit boards of the outer plug module.

Figure 7:
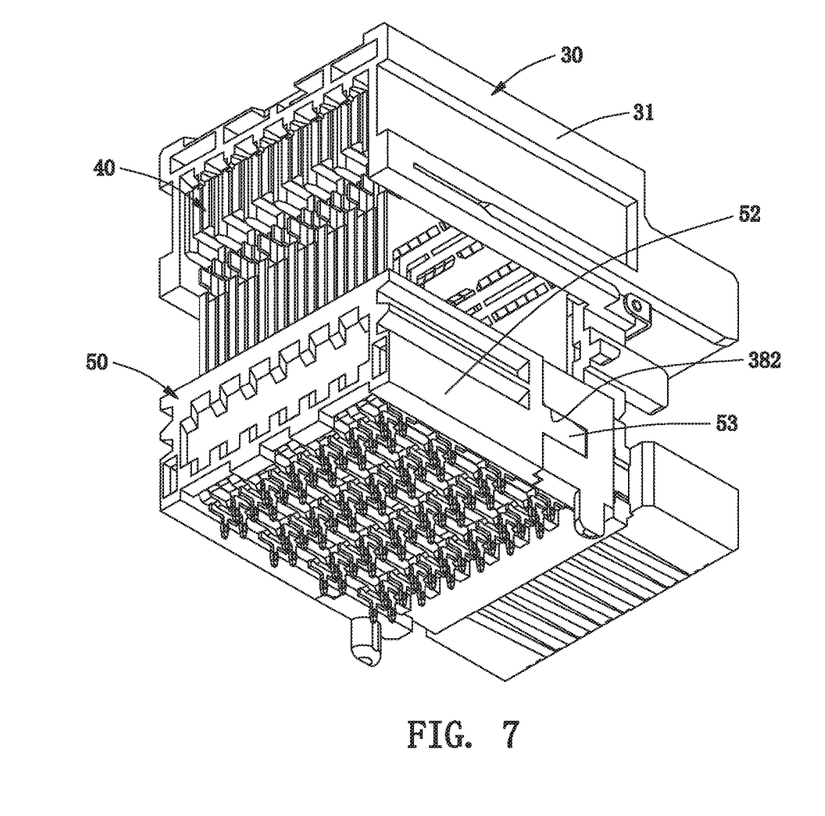
FIG. 7 is a perspective schematic view of the socket housing, the terminal assemblies and the retainer after combined together.

Referring FIGS. 2 and 7, the pluggable connector 1 of the present invention further includes a retainer 50 for fixing these terminal assemblies 40.

Referring to FIGS. 5 and 6, the retainer 50 is U-shaped. The retainer 50 has a first holding arm 51 and two parallel second holding arms 52 being perpendicular to the first holding arm 51. The front end of each second holding arm 52 is suddenly narrowed to form a protruding part 53.

Referring to FIG. 7, when these terminal assemblies 40 are mounted on the socket housing 30, the retainer 50 holds the terminal assemblies 40 from the rear of the terminal assemblies 40, and the protruding parts 53 of the two second holding arms 52 are engaged with the corresponding holding slots 382 located on the two sides of the insulating base 31 for further fixing the terminal assemblies 40.

Referring to FIG. 1, after the pluggable connector 1 is assembled, the upper port 101 of the shielding case 10 is aligned with the upper circuit board slot 34 (label seen in FIG. 5) of the socket housing 30, and the lower port 102 is aligned with the lower circuit board slot 35 (label seen in FIG. 5) of the socket housing 30.

Figure 12:
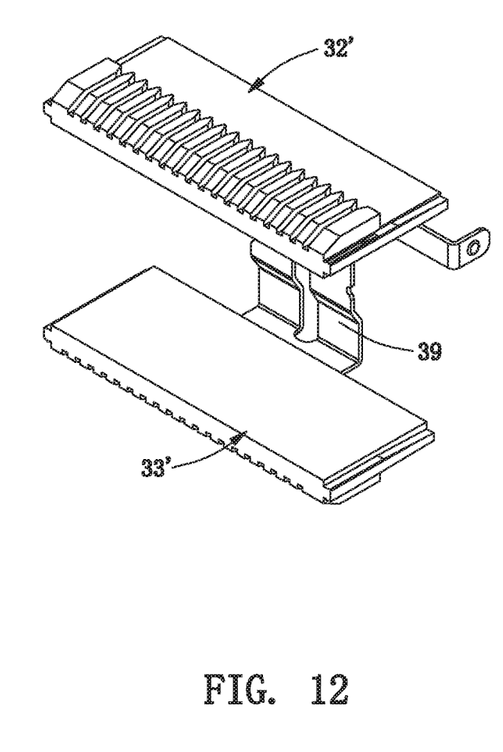
FIG. 12 is a perspective schematic view of another embodiment of the two anti-EMI blocks.
Figure 13:
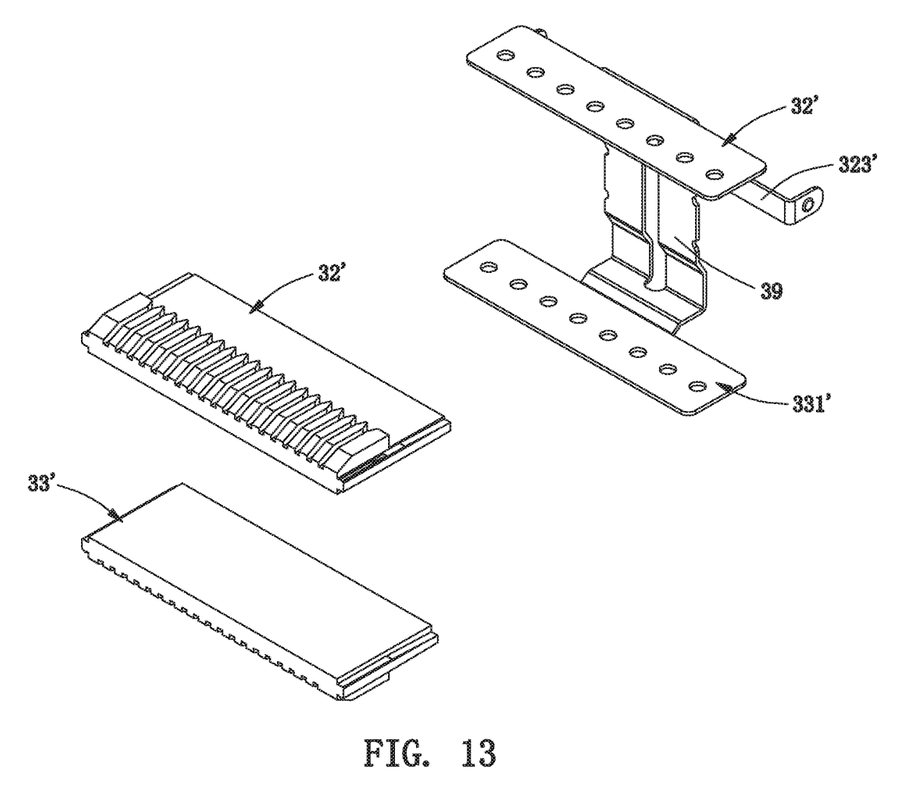
FIG. 13 is an exploded view of the two anti-EMI blocks of FIG. 12.

Please refer to FIGS. 12 and 13, in another embodiment, the first anti-EMI block 32' and the second anti-EMI block 33' are connected into a whole through a vertical metal sheet 39. Specifically, the top of the vertical metal sheet 39 is connected to the vertical grounding arm 323', and the bottom of the vertical metal sheet 39 is connected to the lower metal member 331', whereby the two separate anti-EMI blocks 32', 33' are connected into an integral structure. In fact, in the embodiment, the vertical metal sheet 39, the upper metal member 321' and the lower metal member 331' are made of the same piece of metal, and the combination of the first and second anti-EMI blocks 32', 33' is formed by the injection molding process.

As described above, the pluggable connector 1 of the present invention employs two separate anti-EMI blocks 32, 33 to improve the anti-electromagnetic interference capability of the pluggable connector.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pluggable connector with anti-electromagnetic interference capability, comprising:
   a socket housing including an insulating base, a first anti-EMI block independently mounted on the insulating base and a second anti-EMI block independently mounted on the insulating base; the insulating base having an upper bracket extending horizontally and a lower bracket being extending horizontally and being located under the upper bracket; the first anti-EMI block being combined with the upper bracket to form an upper circuit board slot; the second anti-EMI block being combined with the lower bracket to form a lower circuit board slot; the insulating base further having a mounting frame extending rearward from the top of the insulating base and a mounting space formed below the mounting frame;
   multiple terminal assemblies being mounted in the mounting space and including multiple signal terminal assemblies and multiple ground terminal assemblies;

these terminal assemblies being arranged side by side in the order of ground-signal-signal; and a shielding case having an upper port and a lower port; the upper port being aligned with the upper circuit board slot, and the lower port being aligned with the lower circuit board slot.

2. The pluggable connector as claimed in claim 1, wherein the upper bracket is inverted U type, and the lower bracket is U type; the upper bracket and the lower bracket are symmetrical to each other and separated from each other;

the first anti-EMI block has an upper horizontal insulation board and an upper metal member fixed in the upper horizontal insulation board; the upper metal member has an upper horizontal grounding sheet embedded in the upper horizontal insulation board, and a vertical grounding arm being perpendicularly connected to the upper horizontal grounding sheet and extending toward left and right sides; the upper horizontal insulation board is combined with the upper bracket to close the bottom of the upper bracket and form an upper circuit board slot;

the second anti-EMI block has a lower horizontal insulation board and a lower metal member fixed in the lower horizontal insulation board; the lower horizontal insulation board is combined with the lower bracket to close the top of the lower bracket and form a lower circuit board slot;

the insulating base further includes two rows of upper terminal-receiving grooves formed respectively on the upper bracket and on upper horizontal insulation board and located in the upper circuit board slot, and two rows of lower terminal-receiving grooves formed respectively on the lower bracket and on the lower horizontal insulation board and located in the lower circuit board slot.

3. The pluggable connector as claimed in claim 2, wherein each terminal assembly includes a support frame, a pair of upper conductive contact parts extending forward from the front of the support frame, a pair of lower conductive contact parts extending forward from the front of the support frame and being located under the pair of upper conductive contact parts, and multiple conductive tails extending downward from the bottom of the support frame; the pair of upper conductive contact parts are inserted into the corresponding upper terminal-receiving grooves and are exposed in the upper circuit board slot; and the pair of lower conductive contact parts are inserted into the corresponding lower terminal-receiving grooves and are exposed in the lower circuit board slot.

4. The pluggable connector as claimed in claim 2, wherein the upper bracket is provided with a pair of upper guiding grooves;

the lower bracket is provided with a pair of lower guiding grooves;

the upper horizontal insulation board has two first flanges formed on two sides thereof respectively; and the lower horizontal insulation board has two second flanges formed on two sides thereof respectively;

when the first and second anti-EMI blocks are combined with the insulating base, the two first flanges are inserted into the corresponding upper guiding grooves to close the upper bracket, and the two second flanges are inserted into the corresponding lower guiding grooves to close the lower bracket.

5. The pluggable connector as claimed in claim 2, wherein the vertical grounding arm has two end portions, which are respectively located on two sides of the vertical grounding arm and are perpendicularly bent toward the insulating base; each end portion forms a protrusion thereon.

6. The pluggable connector as claimed in claim 5, wherein the vertical grounding arm further has a holding piece, which is located on the bottom of the vertical grounding arm and bent toward the insulating base; the holding piece can be engaged with a holding hole formed on the insulating base.

7. The pluggable connector as claimed in claim 1, further comprising a light guide member, which includes two symmetrical light guide tubes being connected together and being made of materials suitable for propagating light, wherein the rear of the two light guide tubes are mounted on two sides of the socket housing, and the front of the two light guide tubes are located in front of the socket housing.

8. The pluggable connector as claimed in claim 1, further comprising a retainer for fixing these terminal assemblies, wherein the retainer is U-shaped and has a first holding arm and two parallel second holding arms being perpendicular to the first holding arm;

the insulating base disposes two holding slots located respectively on two sides thereof;

when these terminal assemblies are mounted on the socket housing, the retainer holds the terminal assemblies from the rear of the terminal assemblies, and the fronts of the two second holding arms are engaged with the corresponding holding slots to fix these terminal assemblies.

9. The pluggable connector as claimed in claim 1, wherein there form multiple long grooves on the top of the mounting space to fix the corresponding terminal assemblies.

10. The pluggable connector as claimed in claim 1, wherein the shielding case includes a shielding frame, a bottom plate mounted on the bottom of the shielding frame, a rear plate mounted on the rear of the shielding frame, a cover around the front of the shielding frame, and a spacer located in the middle of the shielding frame for separating the upper port and the lower port.

* * * * *